July 11, 1939. F. H. LE JEUNE 2,165,863
METHOD OF FORMING A VEHICLE WHEEL
Filed Dec. 9, 1935 2 Sheets-Sheet 1
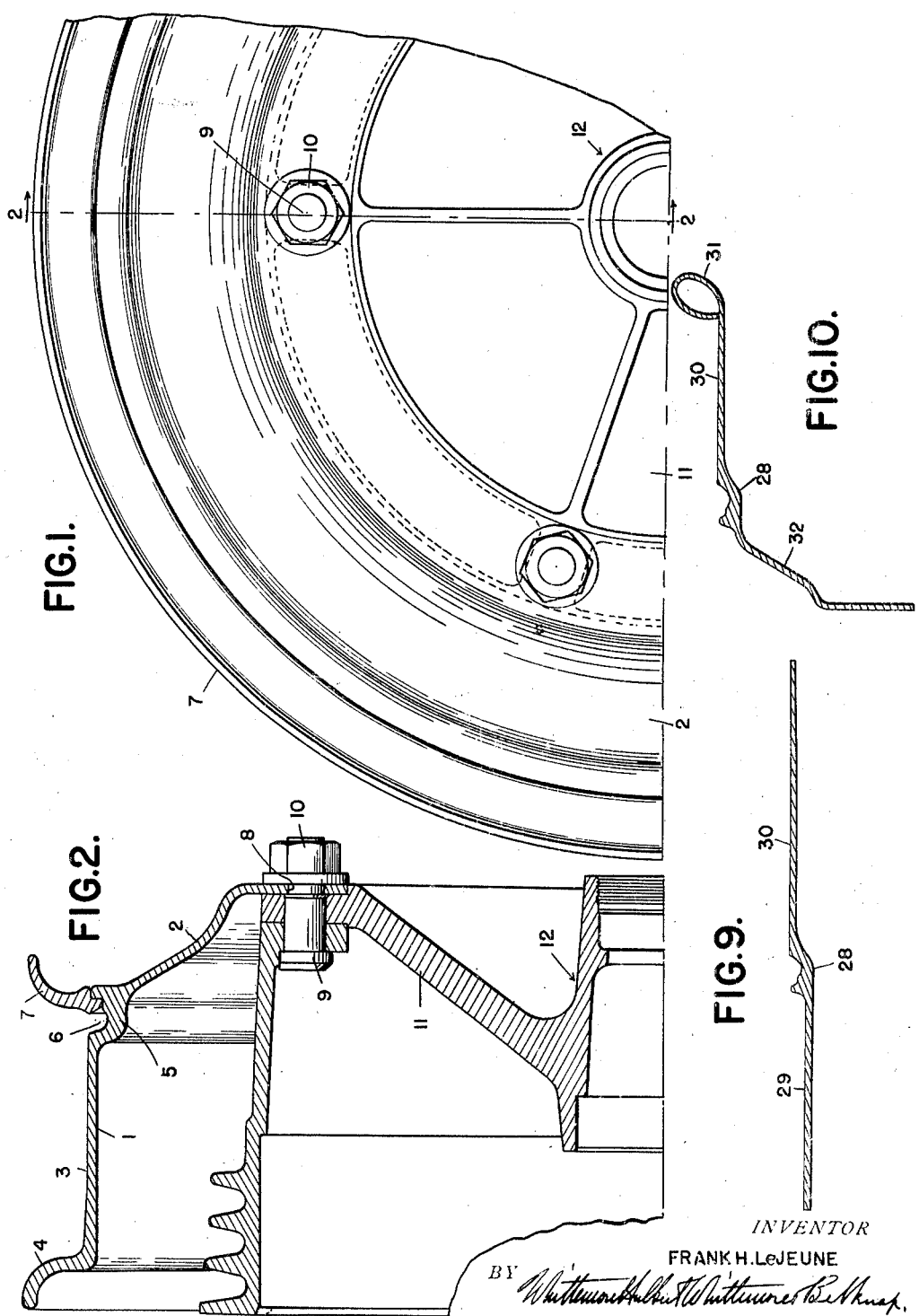
INVENTOR
FRANK H. LeJEUNE
BY
ATTORNEYS July 11, 1939.  F. H. LE JEUNE  2,165,863
METHOD OF FORMING A VEHICLE WHEEL
Filed Dec. 9, 1935  2 Sheets-Sheet 2
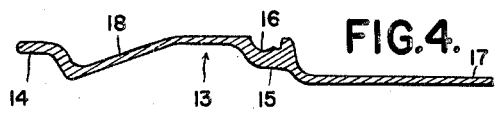
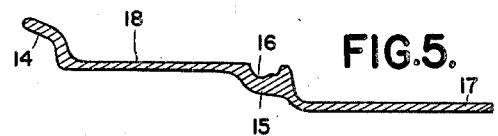
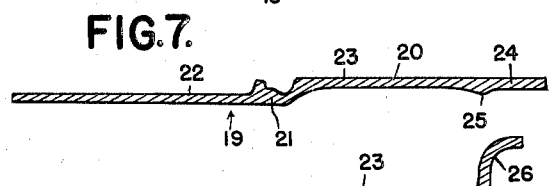
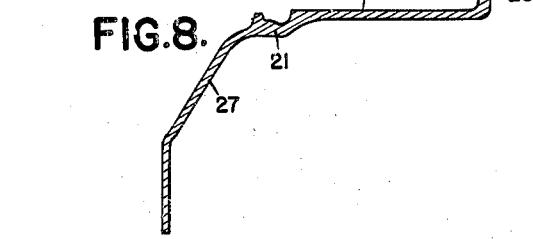
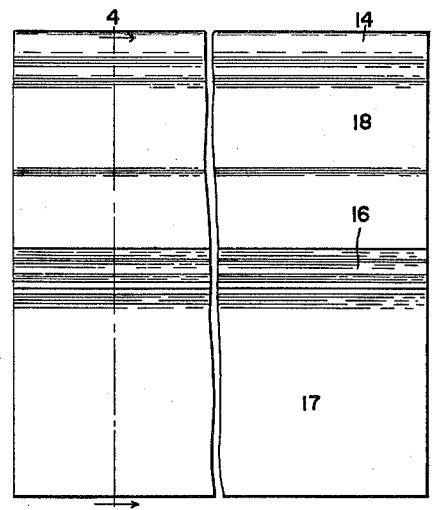
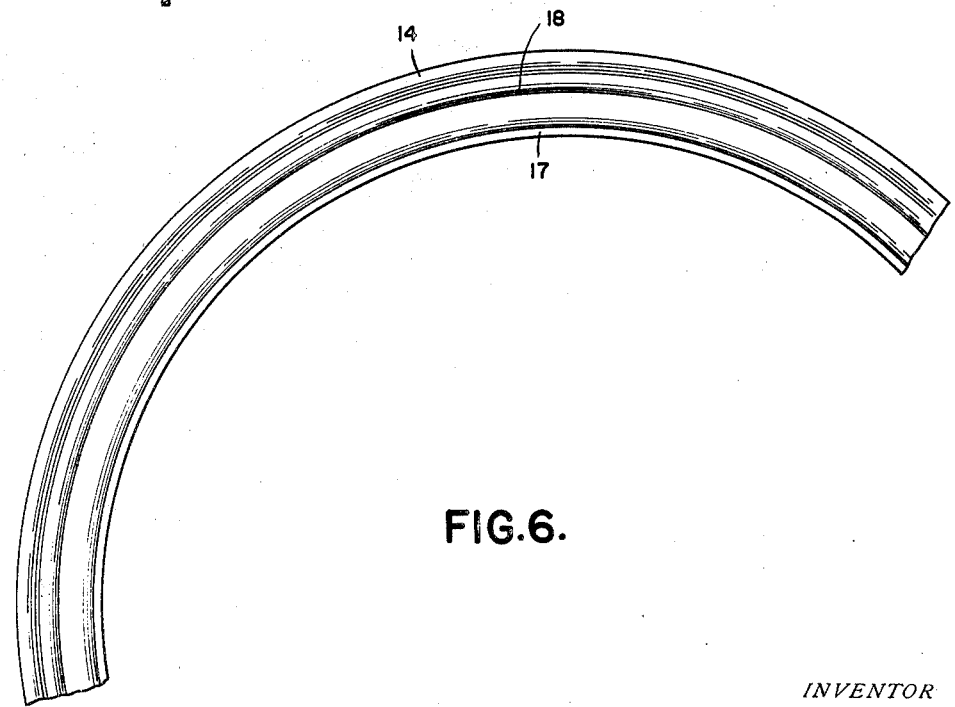
INVENTOR
FRANK H. LeJEUNE
BY
ATTORNEYS Patented July 11, 1939

2,165,863

UNITED STATES PATENT OFFICE 2,165,863

METHOD OF FORMING A VEHICLE WHEEL

Frank H. Le Jeune, Detroit, Mich., assignor to Kelsey-Hayes Wheel Company, Detroit, Mich., a corporation of Delaware Application December 9, 1935, Serial No. 53,628

2 Claims. (Cl. 29—159)

The invention relates to methods of forming vehicle wheels and refers more particularly to methods of forming vehicle wheels having integral tire receiving rims.

The invention has for one of its objects an improved method of forming a vehicle wheel by means of which the wheel may be economically manufactured. The invention has for another of its objects to produce a wheel having the proper distribution of metal to secure the desired strength with lightness of weight.

These and other objects of the invention will become apparent from the following description, taken in connection with the accompanying drawings, in which Figure 1 is an elevation of a wheel showing an embodiment of my invention;

Figure 2 is a cross section on the line 2—2 of Figure 1;

Figure 3 is a plan view of a blank from which the wheel is produced;

Figure 4 is a cross section on the line 4—4 of Figure 3;

Figures 5 and 6 are views illustrating successive steps in the method;

Figure 7 is a view similar to Figure 4, illustrating a modified blank;

Figure 8 is a view similar to Figure 2, illustrating part of a wheel formed from this blank;

Figure 9 is a view similar to Figure 4, illustrating another modified blank;

Figure 10 is a view similar to Figure 2, illustrating part of a wheel formed from this blank.

As illustrated in Figures 1 and 2, the vehicle wheel is of that type having an integral tire receiving rim 1 and rim supporting portion or web 2. The rims has the circular endless base 3, the integral radially outwardly extending tire retaining flange 4 at the inner side edge of the base and the radially inwardly offset enlargement 5 at the axially outer side edge of the base and provided with the radially outwardly opening annular gutter 6 for detachably receiving the tire retaining flange 7. The rim supporting portion 2 is in the nature of a disk having in its central portion the holes 8 for the passage of the bolts 9, which cooperate with the nuts 10 in detachably securing the wheel to the fixed flange 11 of the hub 12. It will be noted that the radial extent of the rim supporting portion 2 is relatively small, it being in the present instance approximately and preferably less than one-half the radial extent of the wheel, which is of considerable importance in the manufacture of the wheel.

As illustrated in Figures 3 and 4, the blank 13 from which the wheel is formed is a blank of indeterminate length produced preferably by rolling from an ingot. This blank preferably has at one of its side edges the transverse flange 14 which corresponds in cross section to the tire retaining flange 4. This blank has intermediate its side edges the longitudinally extending enlargement 15 which is provided with the longitudinally extending groove 16 opening in the same general direction as that in which the flange 14 extends. The blank is also provided with the flat portion 17 which extends from the base of the enlargement 15 to the side edge opposite the flange 14. To provide suitable draft during the rolling, the portion 18 of the blank between the enlargement 15 and the flange 14 extends at an angle. The enlargement 15 corresponds in cross section to the enlargement 5 and the groove 16 corresponds in contour to the gutter 6.

After the blank 13 has been formed, the first step consists in bending the portion 18 so that it becomes flat and extends substantially parallel to the portion 17 to form the base 3 of the tire receiving rim. At this time, the flange 14 assumes the position of the flange 4 of the tire receiving rim, as shown particularly in Figure 5.

The blank is then hooped into circular form, as shown in Figure 6, and its ends are welded together, after which the blank is sized and the portion 17 is bent radially inwardly to assume the position of the rim supporting portion or web 2 of the wheel. During this radially inward bending, the portion 17 is progressively upset toward its inner periphery to progressively increase its thickness.

With this method, the vehicle wheel can be economically manufactured and furthermore the metal of which the wheel is made can be properly distributed during the forming to secure the desired strength with lightness of weight.

Figure 7 illustrates another blank 19 which may be used in the forming of a vehicle wheel of the character above described. This blank differs mainly from the blank 13 in that it does not have any fixed tire retaining flange corresponding to the flange 14. Instead, the blank 19 is formed with the flat portion 20 which extends from the upper portion of the intermediate enlargement 21 to the side edge of the blank and substantially parallel to the other flat portion 22. This flat portion 20 is formed during the rolling of the ingot with the part 23 extending from the intermediate enlargement, the side edge part 24 of greater thickness than the part 23 and the connecting part 25 of still greater thickness. The parts 24 and 25 are adapted to form the fixed tire retaining flange and the part 25 is positioned to be located at the bend of the fixed tire retaining flange to the base of the rim which is formed by the part 23.

After the blank 19 has been formed, it is hooped into circular form and its ends are welded together, after which the circular blank is sized and the parts 24 and 25 are bent radially outwardly to form the fixed tire retaining flange 26, as shown in Figure 8, and the flat portion 22 is bent radially inwardly to form the rim supporting portion or web 27, as also shown in Figure 8.

Figure 9 illustrates another blank from which the wheel may be formed. This blank is also preferably formed by rolling an ingot and has the intermediate longitudinally extending grooved enlargement 28 and the flat portions 29 and 30 leading in opposite directions from this enlargement. The flat portion 30 in this instance is preferably tapered and decreases in thickness away from the enlargement to its side edge. After this blank has been rolled, it is hooped into circular form and its ends are welded together, after which the circular blank is sized and the free edge part of the flat portion 30 is curled radially outwardly to produce the hollow bead 31, as shown in Figure 10, and the flat portion 29 is bent radially inwardly to produce the rim supporting portion or web 32, as also shown in Figure 10. The bead 31 forms the fixed tire retaining flange.

What I claim as my invention is:

1. The method of forming a vehicle wheel having an integral tire receiving rim, which comprises forming a strip having a longitudinally extending enlargement intermediate its side edges with a longitudinally extending groove in said enlargement opening at one side of the strip and having a transverse flange at one of its side edges, hooping the strip into a circular band with the groove opening radially outwardly to form a tire receiving rim with an annular gutter adapted to receive a detachable flange, bending a portion of the band other than the rim in a zone adjacent to the groove radially inwardly to form the rim supporting portion of the wheel, and during the bending upsetting the material to progressively increase the thickness of the rim supporting portion.

2. The method of forming a vehicle wheel having an integral tire receiving rim, which comprises forming a strip having a longitudinally extending grooved enlargement intermediate its side edges and flat portions extending from the enlargement to the side edges, hooping the strip into a circular band with the groove opening radially outwardly to form an annular gutter adapted to receive a detachable tire retaining flange, bending an edge part of one of the flat portions to form a tire retaining flange, and bending the other flat portion radially inwardly to form the web of the wheel.

FRANK H. LE JEUNE.